United States Patent Office 3,560,420
Patented Feb. 2, 1971

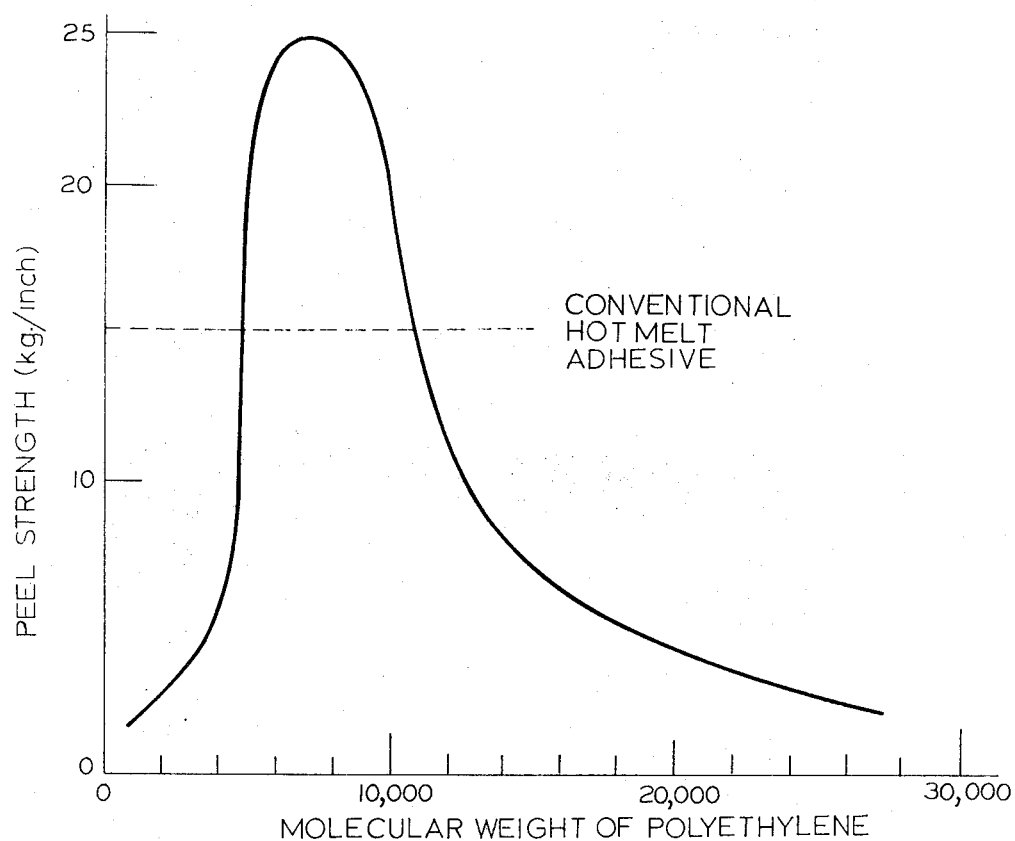

3,560,420
HOT MELT ADHESIVE COMPRISING POLY-
ETYLENE AND AN ETHYLENE-VINYL-
ACETATE COPOLYMER
Toru Tamura and Shigeru Kondo, Osaka, Japan, assignors to Matsushita Electric Industrial Co., Ltd., Osaka, Japan
Filed June 27, 1969, Ser. No. 837,027
Int. Cl. C08g 37/00; C09j 3/14, 3/26
U.S. Cl. 260—25                                 3 Claims

ABSTRACT OF THE DISCLOSURE

A thermoplastic hot melt adhesive characterized by high performance and low cost, is obtained by blending low molecular weight polyethylene, phenolic resin, abietic acid ester, terpene, resin, and ethylene-vinylacetate copolymer, such blend containing a homogeneous mixture of 30 to 60 weight percent of ethylene-vinylacetate copolymer which has 20 to 40 weight percent vinylacetate and which has a specific viscometric value from 0.6~0.90, 0 to 20 weight percent of phenolic resin which has a softening temperature of 70 to 110° C., 5 to 20 weight percent of polyethylene which has molecular weight of from 5,000 to 10,000, 10 to 40 weight percent of abietic acid ester which has a softening temperature of 70 to 100° C., 5 to 30 weight percent of terpene resin which has a softening temperature of from 70 to 110° C., the remainder being mineral filler.

This invention relates to a thermoplastic hot melt adhesive.

Conventional hot melt adhesive has a high melting temperature (more than 180° C.) and it is difficult to obtain satisfactory adhesion to thermoplastic sheets therewith due to the deformation of the sheets. On the other hand a conventional hot melt adhesive having high resistance to heat shows a high viscosity at the melting temperature (100,000 cps. at 180° C.) and is difficult to use.

Another trouble of the conventional hot melt adhesive is a poor adhesion which is about 15 kg. per inch of peeling strength at room temperature, as well as high cost.

An object of the present invention is the embodiment of a hot melt adhesive characterized by a high resistance to heat.

Another object of the invention is the embodiment of a hot melt adhesive characterized by a low viscosity and a high peeling strength.

A further object of the present invention is the embodiment of a hot melt adhesive capable of satisfactorily adhering plastic sheet to textile materials.

These and other objects of the present invention will be apparent upon consideration of the following described description taken together with accompanying drawing wherein the single figure is a graphic illustration of the relation between peel strength and the molecular weight of the polyethylene (content 14% by weight).

According to the present invention, a thermoplastic hot melt adhesive characterized by high performance and low cost, is obtained by blending low molecular weight polyethylene, phenolic resin modified with rosin, abietic acid ester which is obtained by reacting abietic acid with polyglycol, terpene resin, and ethylene-vinylacetate copolymer. A thermoplastic hot melt adhesive according to the invention comprises a homogeneous mixture of 30 to 60 weight percent of ethylene-vinylacetate copolymer which has 20 to 40 weight percent vinylacetate and which has a specific viscometric value from 0.6~0.90, 0 to 20 weight percent of phenolic resin which has a softening temperature of 70 to 110° C., 5 to 20 weight percent of polyethylene which has molecular weight of from 5,000 to 10,000, 10 to 40 weight percent of abietic acid ester which has a softening temperature of 70 to 100° C., 5 to 30 weight percent of terpene resin which has a softening temperature of from 70 to 110° C., the remainder being mineral filler.

It is important that the polyethylene suitable for these compositions is low molecular polyethylene but resinous polyethylene as distinquished from wax or grease, must have its molecular weight in the range of 5,000 to 10,000. Said molecular weight defined herein is determined by the viscometric method which uses a solution of polyethylene in tetraline at 130° C. The calculation of the molecular weight is carried out according to the following equation:

$$M = \frac{k \log \xi}{c}$$

where M is the average molecular weight of the polyethylene, $\xi$ is the relative viscosity, c is the base molar concentration of polyethylene in tetraline at about 130° C. and k is a $4.04 \times 10^4$.

Suitable c for measurement is about 0.25 gram of polyethylene in 100 ml of tetraline.

The ethylene-vinylacetate copolymer suitable for the compositions of the present invention must have a specific viscometric value of from 0.6 to 0.90 which is determined by the specific viscometric method using a solution of the ethylene-vinylacetate copolymer in toluene at 30° C.

It is suitable for the test to use 0.25 gram of ethylene-vinylacetate copolymer dissolved in 100 ml, of toluene. Ethylene-vinylacetate copolymer having carbonyl group has good adhesion to wood but poor adhesion to plastic film, but can be improved remarkably by combining ethylene-vinylacetate copolymer with tackifier consisting essentially of phenolic resin, abietic acid ester, terpene resin. The tackifiers suitable for the compositions of this invention can be determined by the Ball and Ring method.

The phenolic resin and terpene resin advantageously have a softening temperature from 70 to 110° C. and the surface tension below 35 dyne/cm. in molten condition at 180° C. and the abietic acid ester advantageously has a softening temperature from 70 to 100° C. and the surface tension below 30 dyne/cm. in molten condition at 180° C. The operable compositions contain 15 to 50 weight percent of tackifier.

A composition having less than 15 weight percent of tackifier shows a high molten viscosity and poor adhesion. On the other hand, a composition having more than 50 weight percent of tackifier is apt to become black and has a poor resistance to heat.

Addition of more than 20 weight percent of mineral filler decreases the peeling strength against polyvinylchloride films and then the amounts of mineral filler are limited up to 20 weight percent.

Operable mineral fillers are any finely divided powder such as calcium carbonate and clays.

Presently preferred illustrative embodiments of the invention comprise the following:

EXAMPLE 1

Parts by weight
Ethylene-vinylacetate copolymer (vinylacetate content is 33% and specific viscometric values is 0.78) _____ 240
Abietic acid ester (softening temperature 85° C.) (the surface tension is 29.2 dyne/cm. in molten condition at 180° C.) _____ 180
Polyethylene (molecular weight 5,000) _____ 50
Antioxidant (3,5-di-tert-butyl hydroxy toluene) ____ 2

The ethylene-vinylacetate copolymer is introduced into a Reed mixer and melted at 170° C.

The abietic acid ester and polyethylene are then added to said melt and mixed well. The mixture is cooled to about 90 to 110° C. and admixed with antioxidant. This adhesive composition is a yellowish solid and has a softening temperature of about 75° C. The viscosity at 160° C. is as low as 50,000 cps.

At 180° peeling test shows about 20 kg./inch of peel strength when applied to jointing polyvinylchloride film to laminated lauan wood. In this case the peeling speed is 50 mm./min.

EXAMPLE 2

| | Parts by weight |
|---|---|
| Ethylene-vinylacetate copolymer (vinylacetate content is 28% and specific viscometric value is 0.85) | 72 |
| Abietic acid ester (softening temperature 80° C.) (the surface tension is 28.5 dyne/cm. in molten condition at 180° C.) | 26 |
| Polyethylene (molecular weight 7,000) | 20 |
| Phenolic resin (Softening temperature 110° C.) (the surface tension is 33.5 dyne/cm. in molten condition at 180° C.) | 20 |
| Terpene resin (softening temperature 110° C.) (the surface tension 22.7 dyne/cm. in molten condition at 180° C.) | 30 |
| Calcium carbonate | 30 |
| Antioxidant (3,5-di-tert-butyl hydroxy toluene) | 2 |

The ethylene-vinylacetate copolymer is introduced into a Reed mixer and melted at 170° C.

The phenolic resin is then added to the melt and mixed well.

The mixture is admixed further with polyethylene, abietic acid ester, terpene resin, calcium carbonate, and antioxidant.

This adhesive composition is a light yellowish solid, and has then softening temperature of about 115° C. The viscosity at 180° C. is as low as 55,000 cps. at 180°. A peeling test shows about 25 kg./inch of peel strength when applied to jointing polyvinylchloride film to laminated lauan wood. In this case, the peeling speed is 50 mm./min.

EXAMPLE 3

| | Parts by weight |
|---|---|
| Ethylene-vinylacetate copolymer (vinylacetate content is 28% and specific viscometric value is 0.85) | 120 |
| Polyethylene (molecular weight 9,000) | 30 |
| Terpene resin (softening temperature 110° C.) (the surface tension is 22.7 dyne/cm. in molten condition at 180° C.) | 40 |
| Abietic acid ester (softening temperature 100° C.) (the surface tension is 30 dyne/cm. in molten condition at 180° C.) | 50 |
| Antioxidant (phenyl-$\beta$-naphthylamine) | 2 |

The ethylene-vinylacetate copolymer in introduced into a Reed mixer and melted at 180° C. The polyethylene is then added to the melt and mixed well.

The mixture is admixed further with terpene resin, abietic acid ester, and antioxidant. This adhesive composition is a light brown solid and has the softening temperature of about 100° C.

The viscosity at 160° C. is as low as 40,000 cps. A 180° peeling test shows about 20 kg./inch of peel strength when applied to jointing polyvinylchloride film to laminated lauan wood. In this case, the peeling speed is 50 mm./min.

All commercially available antioxidants commonly can be employed such as hydroquinone, 2,2-methylene bis-(4-methyl-6-tert-butylphenol), and phenyl-$\beta$-naphthyl.

What is claimed is:

1. A thermoplastic hot melt adhesive composition comprising a homogeneous mixture of 30 to 60 weight percent of ethylene-vinylacetate copolymer which contains 20 to 40 weight percent of vinyl acetate and which has a specific viscometric value from 0.6–0.90, 0 to 20 weight percent of phenolic resin which has a softening point at from 70° to 110° C., 5 to 20 weight percent of polyethylene having a molecular weight 5,000 to 10,000, 10 to 40 weight percent of abietic acid ester which has a softening temperature of from 70° to 100° C., 5 to 30 weight percent of terpene resin which has a softening temperature of from 70 to 110° C., and remainder being mineral fillers.

2. A thermoplastic hot melt composition according to claim 1, wherein said polyethylene has a molecular weight of from 5,000 to 9,000.

3. A thermoplastic hot melt composition according to claim 2 wherein said abietic acid ester has a softening temperature of from 80 to 100° C.

References Cited
UNITED STATES PATENTS

| | | | |
|---|---|---|---|
| 3,253,059 | 5/1966 | Vollmer | 260—897 |
| 3,417,040 | 12/1968 | Kremer | 260—27 |
| 3,438,921 | 4/1969 | Coburn | 260—27 |
| 3,505,261 | 4/1970 | Battersby | 260—28.5 |

MAURICE J. WELSH, Primary Examiner

R. W. GRIFFIN, Assistant Examiner

U.S. Cl. X.R.

117—122, 161, 168; 156—334, 335; 61—246, 252; 260—27, 38, 41